March 2, 1954
F. R. F. RAMSAY
2,670,989
INDICATING OR CONTROL APPARATUS RESPONSIVE
TO TEMPERATURE VARIATIONS
Filed April 11, 1949
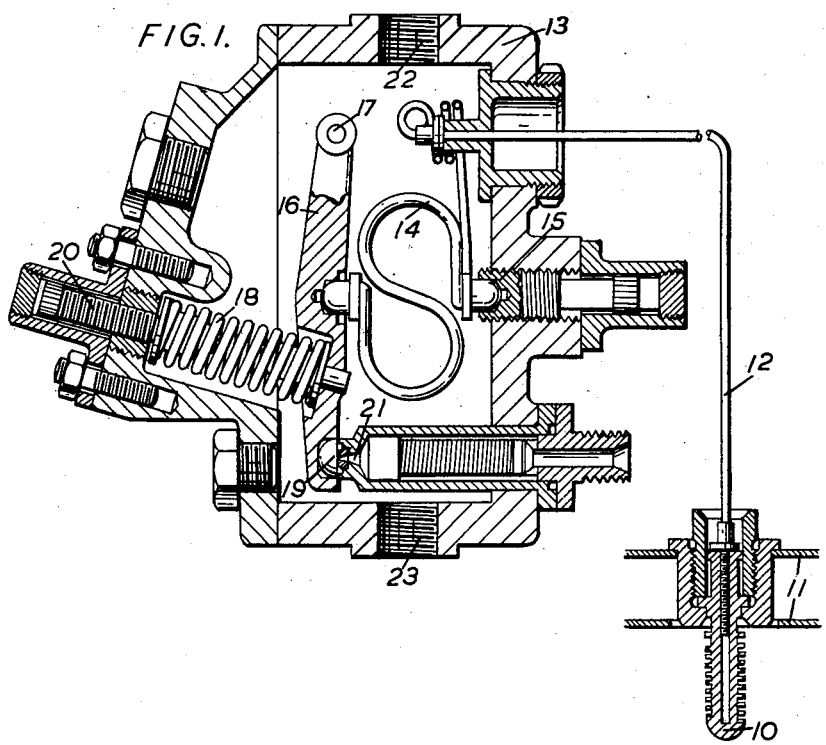
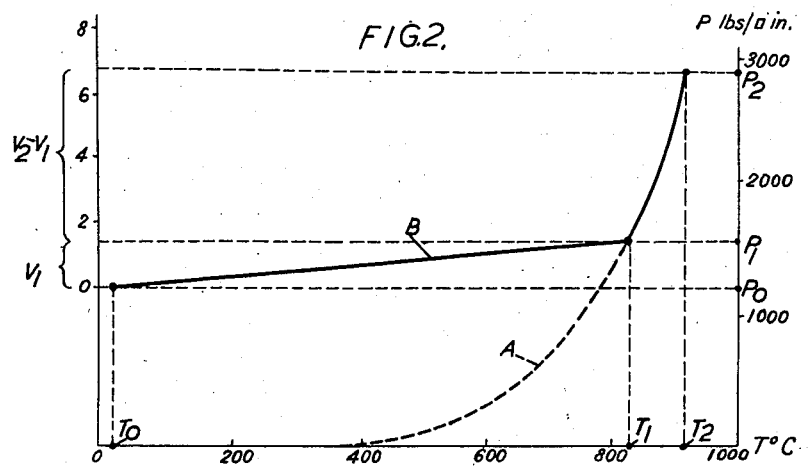
Inventor
Frank R. F. Ramsay
By Emery, Holcombe & Blair
Attorneys

Patented Mar. 2, 1954

2,670,989

UNITED STATES PATENT OFFICE 2,670,989

INDICATING OR CONTROL APPARATUS RESPONSIVE TO TEMPERATURE VARIATIONS

Frank Raymond Faber Ramsay, East Sheen, London, England, assignor to D. Napier & Son Limited, London, England, a company of Great Britain Application April 11, 1949, Serial No. 86,653

Claims priority, application Great Britain April 22, 1948

2 Claims. (Cl. 297—10)

This invention relates to indicating and control apparatus responsive to temperature variations, and has for its object to provide a form of apparatus which will be particularly suitable for indicating or effecting control in accordance with variations in temperature in a high temperature zone within a predetermined high temperature range, will enable a high degree of sensitivity and/or an adequate controlling force to be obtained for temperature variations within that range and will provide for quick response to such variations, while having a substantial margin of safety from damage caused by accidental overheating.

Various forms of temperature responsive indicating and control apparatus have been proposed comprising a fluid-filled chamber, hereinafter referred to for convenience as a "bulb," connected by a tube to a device which moves in response to changes in pressure within the apparatus with resultant changes of volume, the most common device of this character being the Bourdon tube, which either actuates an indicating needle or the like or exercises control over appropriate mechanism. In one such apparatus as hitherto proposed the bulb and pressure responsive device have been filled with liquid and the thermal expansion and contraction of the liquid under the influence of variations in temperature have caused the movement of the pressure responsive device so as to accommodate the changes in volume of the liquid, while, in an alternative arrangement, the bulb, tube and pressure responsive device were partly filled with liquid and partly with the vapour of the liquid and the movement of the pressure responsive device was produced by variations in the vapour pressure of the liquid with temperature variations. It will be seen that, in the former proposal the exact pressure exerted on the liquid by the pressure responsive device at different points in the range of movement was immaterial, the liquid being substantially incompressible, while in the latter case, to give accurate results, its pressure response curve had to be accurately determined.

With the devices operating by thermal expansion the expansion of the liquid for any given temperature rise is comparatively small and if a comparatively large movement of the indicating or control mechanism is required, either movement multiplying mechanism must be employed, with a corresponding reduction in the force which can be applied thereby, or a large volume of liquid must be provided in the bulb, which not only makes the response to temperature variations sluggish but may be inconvenient or impossible to provide for reasons of space, in many applications. Moreover the thermal expansion devices are influenced by the thermal expansion of the various parts of the apparatus containing the liquid thus entailing errors or necessitating mechanism for compensating for variations in atmospheric or other temperatures to which the parts of the apparatus are subject outside the zone in which the bulb lies.

With devices operating by variation in vapour pressure and where a comparatively large movement or force is required from the pressure responsive device for comparatively small variations in temperature, it is necessary to use a liquid which over the predetermined range for which control or indication is required (hereinafter called the predetermined temperature range) is in the higher temperature part of its usable range of vapour pressures. This is because towards the high temperature end of the usable range of vapour pressures there is a comparatively large pressure variation for a given temperature variation, whereas the pressure variation for a given temperature variation progressively decreases towards the lower end of such range.

Since, however, the device must also allow for the temperature to drop down to atmospheric temperature, for example when the apparatus with which it is used is out of operation, if the predetermined temperature range is high, the pressure responsive device has to allow for expansion and contraction over the whole range from atmospheric temperature up to the highest temperature within the predetermined temperature range. It is moreover an essential of devices of the kind in question that there is always some liquid present in the bulb and therefore subject to the controlling temperature, but if the predetermined temperature range is high the expansion of the pressure responsive device during the rise in temperature to reach that range will be such as to take all the liquid out of the bulb before the predetermined temperature range is reached. To avoid this either the bulb must be made comparatively large, which makes the apparatus sluggish, or the pressure responsive device must be such that it expands little for large variations in pressure which means that the device will be insensitive and provide little movement for variations in temperature within the predetermined range.

Further, since for apparatus designed to operate at high temperatures the bulb has to withstand high pressures, it is desirable to keep the bulb as small as possible both to enable it more readily to be made of adequate strength and to facilitate its accommodation within the high temperature zone.

The size of the bulb limits the maximum internal pressure and hence the temperature which such apparatus can measure with accuracy, since the apparatus will only work accurately if the walls of the bulb do not yield appreciably due to the internal pressure. It has hitherto been necessary in thermometers of the liquid filled and vapour pressure types to provide a bulb of comparatively large size in order to ensure that there is always some liquid in the bulb, and this has limited the maximum permissible internal pressure and hence has restricted maximum working temperature, in the case where the liquid is mercury, to about 650° C.

The object of the present invention is to provide apparatus for indicating or control in accordance with the temperature in a high temperature zone within a predetermined high temperature range which will be less subject to the difficulties and limitations referred to above as present in the known types of apparatus and will thus tend to provide an apparatus particularly well suited to its purpose.

The invention is particularly but not exclusively applicable to apparatus in which indication or control is desired in accordance with temperatures such as those which prevail, for example, in the blade chamber of a combustion turbine.

Apparatus according to the present invention for indicating or control in accordance with the temperature in a high temperature zone within a predetermined high temperature range comprises a closed chamber having one part which is adapted to lie in the high temperature zone and another part which is adapted to lie outside this zone, the latter part including a device which moves in response to changes in pressure within the chamber with resultant changes in the volume of the chamber, the chamber at temperatures below the said high temperature range being wholly filled with liquid under a pressure which exceeds the vapour pressure of the liquid, while at temperatures within the said range the vapour pressure of the liquid determines the pressure in the chamber and the liquid in the first mentioned part of the chamber at least partly vaporises, whereby the movement of the pressure responsive device below the said high temperature range is in accordance with the thermal expansion of the liquid, while its movement within the said range is in accordance with the variations in the vapour pressure of the liquid.

Thus over the temperature range below the predetermined high temperature range the pressure in the chamber exceeds the vapour pressure of the liquid and the chamber thus remains filled with liquid whereas over the predetermined high temperature range the pressure responsive device has a substantial range of movement in which its position is determined and maintained by vapour pressure.

The bulb, that is the part of the apparatus adapted to lie in the high temperature zone, may consist of a small bore tube closed at one end or a plurality of small bore tubes in parallel, and the pressure responsive device may consist of a Bourdon tube, these parts being connected together by a suitable length of capillary tubing and the whole constituting the said closed chamber. The volume of the bulb should be approximately equal to the volume of liquid required to expand the Bourdon tube from the lower to the upper end of the said high temperature range, so that the bulb is full of liquid at the lower end of the range but contains only vapour at the upper end of the range.

Preferably the liquid is one whose boiling point at atmospheric pressure is substantially below the said high temperature range so that the whole of this range is within the part of the temperature-vapour pressure curve of the liquid in which comparatively small variations of temperature produce comparatively large variations in vapour pressure.

If the movement due to variations in pressure within the said high temperature range is to be large the characteristic of the pressure responsive device must normally be such that the pressure therein will only rise comparatively little due to the thermal expansion of the liquid below the said high temperature range. This means that a pressure responsive device must be used which has comparatively large movement for small variations in pressure, but it must be filled with liquid at a sufficient initial pressure to prevent the formation of vapour until the lower end of the said high temperature range is reached. In practice this will generally mean that the apparatus is filled at a low temperature, e. g. room temperature or thereabouts, with liquid at a pressure approaching the vapour pressure of the liquid at the lower end of the said high temperature range. The liquid used may conveniently be mercury.

The invention may be carried into practice in various ways but one particular construction of apparatus comprising an override fuel control for a combustion turbine in an aircraft propulsion plant, and which works in dependence on the temperature in the blade chamber, will be described by way of example with reference to the accompanying drawings in which, Figure 1 is a sectional elevation of the apparatus, and Figure 2 is a graph illustrating the relationships between the temperature and the pressure and volume of the liquid or liquid and vapour within the pressure responsive device.

The apparatus includes a bulb in the form of an elongated thick walled cylindrical chamber 10. The bulb is externally ribbed or finned to increase its surface area and so increase the rate of heat flow to and from it, and also to strengthen it.

The bulb is mounted in the double wall 11 of the blade chamber of the turbine in such a manner that it is exposed to the hot gases flowing to the turbine.

Secured to the bulb and communicating with its interior is a capillary tube 12 which leads to a housing 13 which may be mounted in any convenient position on the aircraft. The other end of the capillary tube communicates with the interior of a Bourdon tube 14 situated within the housing 13.

One end of the Bourdon tube 14 bears against a stationary abutment 15 which is provided with means whereby it can be adjusted, while the other end bears against a lever 16 which is pivoted in the housing by its upper end 17.

A spring 18 bears against the lever 16 in opposition to the force exerted by the Bourdon tube 14 so that the position of the lower end 19 of the lever will depend upon the initial loading and characteristic of the spring, and also upon the force exerted by the Bourdon tube 14. The outer end of the spring 18 bears against an adjustable abutment 20 by which its initial loading can be adjusted.

The force exerted by the Bourdon tube 14 can be used to actuate a great variety of control or indicating mechanisms or devices, but in the present arrangement, which is given purely by way of example, it controls the amount of fuel which can be bled off through an orifice 21 which in turn controls the stroke of a variable stroke fuel pump and in this manner regulates the amount of fuel supplied to the burners in the combustion chambers of the turbine.

The bulb 10, the capillary tube 12 and the Bourdon tube 14 are filled with mercury under pressure. In the present example, where the device is intended to have an operating range of from 815° C. to 935° C., the pressure of the mercury at the filling temperature of 15° C. is 1,451 pounds per square inch. The manner in which the filling pressure can be ascertained is described below.

When the temperature of the bulb 10 lies in the operating range some of the mercury contained in its is vaporized so that the pressure in the bulb 10, the capillary tube 12 and the Bourdon tube 14 is equal to the vapour pressure of mercury at this temperature. The Bourdon tube 14 will exert a pressure on the lever 16 in opposition to the spring 18 proportional to the pressure inside it, and therefore proportional to the temperature of the bulb 10. The clearance between the lower end 19 of the lever 16 and the orifice 21 will therefore depend on the pressure in the Bourdon tube 14 and hence on the temperature of the bulb 10. Within the operating range the higher the temperature of the bulb 10 the greater will be the pressure in the Bourdon tube 14, and hence the greater the clearance between the lower end 19 of the lever 16 and the orifice 21. This will bring about a reduction in the stroke of the fuel pump and hence there will be a reduction in the amount of fuel supplied to the burners. The apparatus therefore provides an automatic temperature override control and can be adjusted so that it tends to maintain the temperature of the gases entering the turbine at a substantially constant value within the said range.

The internal diameter of the bulb 10 is preferably small so that when mercury vapour forms therein during operation within the high temperature range the surface tension of the mercury will cause the vapour to be formed and maintained as a single stable bubble substantially filling an appropriate length of the bulb, that is to say the surface of the liquid mercury at the end or ends of the bubble will extend across the bore of the bulb as does the liquid in a normal liquid thermometer. In this way unsteadiness in the operation of the apparatus due to turbulence of the liquid and vapour in the tube during changes in temperature tends to be avoided.

For the operating conditions mentioned above suitable dimensions for the bore of the bulb 10 have been found to be 0.705" to 0.708" long by 0.050" in diameter. One way in which these dimensions may be determined will be described below.

The dimensions of the bulb in relation to those of the hot zone should in any case be such that the whole of the bulb is in the hot zone so that the temperature of the whole bulb is substantially uniform. In practice this will usually entail a short length of the capillary tube adjacent to the bulb also lying in the hot zone as shown in the drawing.

The operation of the apparatus may be analysed as follows:

The operation depends upon the fact that the thermal expansion of a liquid follows an approximately straight line law while the vapour pressure of the liquid is governed by a higher law.

The accompanying graph (Figure 2) illustrates the functioning of the apparatus shown in Figure 1 and for convenience in the description the following symbols will be used:

$T_0$ = temperature at which the bulb is initially filled.
$T_1$ = temperature at the start of the control range.
$T_2$ = temperature at the end of the control range.
$t$ = ambient temperature of the capillary tube and the Bourdon tube.
$P_0$ = filling pressure (static).
$P_1$ = vapour pressure at $T_1$.
$P_2$ = vapour pressure at $T_2$.
$V_0$ = volume of the bulb, after filling, at $T_0$.
$V_1$ = volume expansion of the Bourdon tube from $T_0$ to $T_1$.
$V_2$ = volume expansion of the Bourdon tube from $T_0$ to $T_2$.
$a$ = coefficient of cubical expansion of mercury.
$\beta$ = coefficient of cubical expansion of the bulb.

$\frac{p}{v}$ = ratio of pressure increase to volumetric expansion of Bourdon tube.

Referring to Figure 2, the volume expansion of the Bourdon tube is shown on the left hand scale. Changes in the volume expansion are proportional to changes in the pressure P within the apparatus, which is shown in the right hand scale. The temperature-vapour pressure curve for any given liquid, in this case mercury, is invariable and is shown at A. For a given temperature control range $T_1$ to $T_2$ the corresponding pressure range $P_1$ to $P_2$ is therefore known. The corresponding volumetric expansion of the Bourdon tube, $V_2-V_1$, can then be marked off on the left hand scale.

The volume of the bulb at $T_1$ is $$V_0[1+\beta(T_1-T_0)]$$

Now at $T_1$ the bulb is still full of liquid mercury, the volume of which must also be $$V_0[1+\beta(T_1-T_0)]$$

At the temperature $T_0$ the volume of mercury present in the bulb was $V_0$, which at the temperature $T_1$ would occupy the volume $$V_0[1+a(T_1-T_0)]$$

Thus a quantity of mercury must have been expelled from the bulb in rising from $T_0$ to $T_1$, this quantity having at $T_1$ the volume:

$$V_0[1+a(T_1-T_0)]-V_0[1+\beta(T_1-T_0)]$$
$$=V_0(a-\beta)(T_1-T_0)$$

Now supposing this expelled mercury has a volume $x$ at $T_0$.

Then at $t$ it would have the volume $$x[1+a(t-T_0)]$$

which by definition is the volume $V_1$. Thus, $$x=\frac{V_1}{1+a(t-T_0)}$$

At $T_1$ the expelled mercury would have the volume $x[1+\alpha(T_1-T_0)]$. But this volume has already been found to be $V_0(\alpha-\beta)(T_1-T_0)$. Therefore, $$x[1+\alpha(T_1-T_0)]=V_0(\alpha-\beta)(T_1-T_0)$$

and substituting for $x$ the expression obtained above, $$V_1=\frac{V_0(\alpha-\beta)(T_1-T_0)[1+\alpha(t-T_0)]}{[1+\alpha(T_1-T_0)]}$$

At $T_2$ the bulb no longer contains mercury, and if the vapour in the bulb be neglected an amount of mercury with a volume $V_0$ at $T_0$ has been expelled from the bulb into the Bourdon tube and there has acquired the temperature $t$. The volume of this mercury at the temperature $t$ equals the volumetric expansion $V_2$ of the Bourdon tube from $T_0$ to $T_2$. In other words, $$V_2=V_0[1+\alpha(t-T_0)]$$

Since a change in pressure is proportional to the volumetric expansion of the Bourdon tube, $$\frac{p}{v}=\frac{P_1-P_0}{v_1}=\frac{P_2-P_0}{v_2}$$

Then substituting for $V_1$ and $V_2$ the expressions obtained above, it will be seen that $$\frac{p}{v}=\frac{(P_1-P_0)[1+\alpha(T_1-T_0)]}{V_0(\alpha-\beta)(T_1-T_0)[1+\alpha(t-T_0)]}=\frac{(P_2-P_0)}{V_0[1+\alpha(t-T_0)]}$$

It is not necessary that the ambient temperature should be determined with any great accuracy, but it should be borne in mind that the values of $P_0$ and $V_0$ are dependent upon it. It will also be realised that the values given to $\alpha$ and $\beta$ may differ slightly in different parts of the expression, since the coefficients vary to a small extent with the temperature range.

Starting with a given Bourdon tube, the $$\frac{p}{v}$$

characteristic of the tube must be measured, and it is then possible to calculate $V_0$ and $P_0$ from the above equations for any desired temperature range.

Alternatively, starting with a bulb of a given volume, the characteristics of the Bourdon tube and the static pressure $$\left(\frac{p}{v} \text{ and } P_0\right)$$

for the desired temperature range can be worked out.

A lower limit to the volume $V_0$ of the bulb 10 is approached when the volume of liquid in the capillary tube 12 begins to be appreciable in comparison with that of the bulb 10, since the ambient temperature around the hot end of the capillary tube changes considerably in practice and this would cause an excessive shift of the temperature limits in the control range if the volume of liquid in the capillary were comparable with that of the bulb.

It will be apparent that with apparatus according to the present invention, since the formation of vapour within the bulb only begins when the temperature reaches the lower end $T_1$ of the predetermined high temperature range within which the control is required, the bulb is filled with liquid at the temperature $T_1$ with the result that for a given size of bulb the arrangement provides for the maximum displacement of liquid from the bulb under rises in vapour pressure before the bulb becomes empty and the liquid, therefore, no longer subject to the temperature in the high temperature zone. Thus, for a given predetermined high temperature range $T_2-T_1$ and a given required relationship between temperature changes and the movement of or force exerted by the pressure responsive device, the volume $V_0$ of the bulb can be small since the operation of the apparatus as a vapour pressure responsive apparatus is limited solely to the predetermined high temperature range. Conversely for a given size of bulb the maximum movement of or force applied by the pressure responsive device can be obtained over the predetermined high temperature range within which indication or control is desired. Thus the apparatus tends to have a high degree of sensitivity and quick response and to be capable of exerting a comparatively large controlling force over the required high temperature range since its effective operation is limited to that range. Moreover, apart from a small degree of bodily shifting of the range along the temperature-vapour pressure curve, the apparatus is completely unaffected by temperature or other conditions and always operates precisely in accordance with the temperature in the high temperature zone, in spite of such bodily shifting, so that no compensation has to be provided for external influences. Again, since the apparatus uses the part of the temperature-vapour pressure curve of the liquid over which comparatively small variations in temperature produce comparatively large variations in vapour pressure, a very close control in accordance with the temperature conditions in the high temperature zone can be achieved.

Furthermore, if the bulb is accidentally overheated beyond the upper limit of the high temperature range for which the apparatus is adapted to function by movement of the Bourdon tube or other pressure responsive device in accordance with variations in the vapour pressure of the liquid, the risk of damage to the apparatus by reason of the increase in pressure thereby caused is small because the increase in pressure of the vapour in the state of a dry gas is small in comparison with the increase in the vapour pressure of a boiling liquid upon raising its temperature.

It will be appreciated that many modifications may be made to the construction specifically described. For instance, instead of having only a single elongated bore the bulb may be made shorter and of greater total cross-sectional area, but divided into a plurality of chambers of small cross-section, e. g. resembling a honey comb such that the liquid is self-supporting in the bulb or each of the small chambers by reason of its surface tension.

What I claim as my invention and desire to secure by Letters Patent is:

1. Apparatus responsive to the temperature in a high temperature zone within a predetermined high temperature range, which consists of a closed chamber comprising a small bore tube closed at one end and adapted to lie in said high temperature zone and a Bourdon tube connected to said small bore tube by a length of capillary tubing, said Bourdon tube and at least part of the capillary tubing being adapted to lie outside said high temperature zone, the volume of said small bore tube being approximately equal to the volume expansion of said Bourdon tube from the lower to the upper end of said high temperature range, and mercury within said chamber under a pressure which exceeds the vapour pressure of mercury at temperatures below said high temperature range, said chamber being completely liquid filled at such lower temperatures, while at temperatures within the said high temperature range the mercury is at least partly vaporised in the small bore tube so that its vapour pressure determines the pressure in the chamber, said small bore tube being completely filled with vapour at the upper end of said high temperature range, whereby the movement of the Bourdon tube below said high temperature range is in accordance with the thermal expansion of liquid mercury while its movement within said high temperature range is in accordance with the variations of the vapour pressure of mercury and above said high temperature range its movement is in accordance with the thermal expansion of mercury vapour.

2. Apparatus as claimed in claim 1 in which said high tempearture range includes temperatures substantially in excess of 650° C.

FRANK RAYMOND FABER RAMSAY.

References Cited in the file of this patent

UNITED STATES PATENTS

| Number | Name | Date |
|---|---|---|
| 1,063,349 | Hodgkinson | June 3, 1913 |
| 1,326,957 | Norwood | Jan. 6, 1920 |
| 1,629,174 | Patton | May 17, 1927 |
| 1,632,152 | Tate | June 14, 1927 |
| 1,920,458 | Bast | Aug. 1, 1933 |
| 2,012,674 | Schultz | Aug. 27, 1935 |
| 2,475,317 | Gess | July 5, 1949 |

OTHER REFERENCES

Rhodes, pages 64–68 of "Industrial Instruments for Measurement and Control," by Thomas J. Rhodes, published 1941 by the McGraw Hill Book Company.